(12) United States Patent
Thibodeau et al.

(10) Patent No.: US 9,878,447 B2
(45) Date of Patent: Jan. 30, 2018

(54) AUTOMATED COLLECTION AND LABELING OF OBJECT DATA

(71) Applicant: Microsoft Technology Licensing, LLC, Redmond, WA (US)

(72) Inventors: Bryan J. Thibodeau, Sammamish, WA (US); Michael Revow, Bellevue, WA (US); Mihai Jalobeanu, Redmond, WA (US); Grigor Shirakyan, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 177 days.

(21) Appl. No.: 14/683,810

(22) Filed: Apr. 10, 2015

(65) Prior Publication Data
US 2016/0297068 A1   Oct. 13, 2016

(51) Int. Cl.
*B25J 9/16*   (2006.01)
*G05B 19/408*   (2006.01)
(Continued)

(52) U.S. Cl.
CPC ............. *B25J 9/163* (2013.01); *B25J 9/1697* (2013.01); *G05B 19/408* (2013.01);
(Continued)

(58) Field of Classification Search
CPC ............. G06K 9/00664; G06K 9/6203; G06K 9/00201; G06K 9/0255; G06F 17/30244;
(Continued)

(56) References Cited

U.S. PATENT DOCUMENTS

| 6,317,646 B1* | 11/2001 | de Caussin | G05B 19/40937 |
| | | | 700/173 |
| 6,437,823 B1* | 8/2002 | Zhang | H04N 17/002 |
| | | | 348/187 |

(Continued)

OTHER PUBLICATIONS

"International Search Report & Written Opinion Issued in PCT Application No. PCT/US2016/025959", dated Jun. 24, 2016, 18 Pages.
(Continued)

*Primary Examiner* — Adam R Mott
(74) *Attorney, Agent, or Firm* — Lyon & Harr, LLP; Richard T. Lyon

(57) ABSTRACT

Data about a physical object in a real-world environment is automatically collected and labeled. A mechanical device is used to maneuver the object into different poses within a three-dimensional workspace in the real-world environment. While the object is in each different pose an image of the object is input from one or more sensors and data specifying the pose is input from the mechanical device. The image of the object input from each of the sensors for each different pose is labeled with the data specifying the pose and with information identifying the object. A database for the object that includes these labeled images can be generated. The labeled images can also be used to train a detector and classifier to detect and recognize the object when it is in an environment that is similar to the real-world environment.

20 Claims, 8 Drawing Sheets

(51) Int. Cl.
*G06K 9/00* (2006.01)
*G06K 9/62* (2006.01)

(52) U.S. Cl.
CPC ....... *G06K 9/00664* (2013.01); *G06K 9/6255* (2013.01); *G05B 2219/37008* (2013.01); *G05B 2219/37009* (2013.01); *G05B 2219/37555* (2013.01); *Y10S 901/02* (2013.01); *Y10S 901/47* (2013.01)

(58) Field of Classification Search
CPC ......... G06F 17/30247; G06F 17/30259; G06F 17/3028; G05B 2219/37555; G05B 2219/37008; G05B 2219/37009; G05B 19/408; G06T 7/0024–7/0038; G06T 7/004–7/0048; G06T 7/2033; G06T 7/304; B25J 9/163; B25J 9/1697
See application file for complete search history.

(56) References Cited

U.S. PATENT DOCUMENTS

| | | | |
|---|---|---|---|
| 7,280,697 | B2 | 10/2007 | Perona et al. |
| 8,340,816 | B2 | 12/2012 | Funada et al. |
| 8,379,014 | B2 | 2/2013 | Wiedemann et al. |
| 8,731,719 | B2 | 5/2014 | Franzius et al. |
| 8,768,071 | B2 | 7/2014 | Tsuchinaga et al. |
| 2006/0221072 | A1* | 10/2006 | Se ................... G01C 11/06 345/420 |
| 2008/0255704 | A1* | 10/2008 | Braut ............... B25J 13/02 700/264 |
| 2010/0215257 | A1* | 8/2010 | Dariush ........... G06K 9/00369 382/159 |
| 2011/0280472 | A1* | 11/2011 | Wallack ............ B25J 9/1692 382/153 |
| 2012/0053728 | A1* | 3/2012 | Theodorus ....... G06K 9/00664 700/259 |
| 2013/0301911 | A1* | 11/2013 | Rong ............... G06K 9/00369 382/160 |
| 2013/0322740 | A1 | 12/2013 | Chen et al. |
| 2013/0345870 | A1 | 12/2013 | Buehler et al. |
| 2014/0079297 | A1 | 3/2014 | Tadayon et al. |
| 2014/0079314 | A1 | 3/2014 | Yakubovich et al. |
| 2015/0302570 | A1* | 10/2015 | Shirakyan ......... G06T 7/0051 348/46 |
| 2016/0012593 | A1* | 1/2016 | Chao ............... G06K 9/4604 382/209 |
| 2016/0188977 | A1* | 6/2016 | Kearns ............. G06K 9/00664 348/113 |
| 2016/0189358 | A1* | 6/2016 | Boufarguine ..... G06T 7/002 348/50 |

OTHER PUBLICATIONS

Zhang, Zhengyou, "Camera Calibration", In Book of Emerging Topics in Computer Vision—Chapter 2, Jan. 1, 2014, 39 Pages.
Foissotte, et al., "A Two-Steps Next-Best-View Algorithm for Autonomous 3D Object Modeling by a Humanoid Robot", Proceedings of the 2009 Institute of Electrical and Electronics Engineers (IEEE) International Conference on Robotics and Automation, May 12-17, 2009, pp. 1159-1164, IEEE.
Herbst, et al., "RGB-D Object Discovery via Multi-Scene Analysis", 2011 IEEE/RSJ (Institute of Electrical and Electronics Engineers / The Robotics Society of Japan) International Conference on Intelligent Robots and Systems (IROS), Sep. 25-30, 2011, pp. 7, IEEE.
Joachims, "Optimizing Search Engines using Clickthrough Data", Proceedings of the eighth Association for Computing Machinery (ACM) Special Interest Group on Knowledge Discovery and Data Mining (SIGKDD) international conference on knowledge discovery and data mining, Jul. 23, 2002, pp. 10, ACM.
Kang, et al., "Discovering Object Instances from Scenes of Daily Living", Proceedings of the Institute of Electrical andElectronics Engineers (IEEE) 13th International Conference on Computer Vision, Nov. 2011, pp. 8, IEEE.
Karpathy, et al., "Object Discovery in 3D scenes via Shape Analysis", 2013 Institute of Electrical and Electronics Engineers (IEEE) International Conference on Robotics and Automation (ICRA), May 6-10, 2013, pp. 2080-2087, IEEE.
Kasaei, et al., "An Interactive Open-Ended Learning Approach for 3D Object Recognition", Proceedings of the 2014 Institute of Electrical and Electronics Engineers (IEEE) International Conference on Autonomous Robot Systems and Competitions (ICARSC), May 14-15, 2014, pp. 47-52, IEEE.
Mason, et al., "Unsupervised Discovery of Object Classes with a Mobile Robot", 2014 Institute of Electrical and Electronics Engineers (IEEE) International Conference on Robotics and Automation (ICRA 2014), May 31-Jun. 7, 2014, pp. 8, IEEE.
Moosmann, et al., "Unsupervised Discovery of Object Classes in 3D Outdoor Scenarios", 2011 Institute of Electrical and Electronics Engineers (IEEE) International Conference on Computer Vision Workshops, Nov. 6-13, 2011, pp. 1038-1044, IEEE.
Saxena, et al., "Robotic Grasping of Novel Objects using Vision", The International Journal of Robotics Research, Jan. 25, 2008, pp. 18, SAGE Publications.
Shin, et al., "Object Classification based on a Geometric Grammar with a Range Camera", Proceedings of the 2009 Institute of Electrical and Electronics Engineers (IEEE) International Conference on Robotics and Automation, May 12-17, 2009, pp. 6, IEEE.
Shin, et al., "Unsupervised 3D Object Discovery and Categorization for Mobile Robots", Proceedings of the 15th International Symposium on Robotics Research (ISRR), Aug. 28-Sep. 1, 2011, pp. 15, International Foundation of Robotics Research.
Shirakyan, G., Automatic In-Situ Registration and Calibration of Robitic Arm/Sensor/Workspace System, U.S. Appl. No. 14/314,970, Jun. 25, 2014, pp. 1-54.
Von Ahn, et al., "Labeling Images with a Computer Game", Proceedings of the Special Interest Group on Computer Human Interaction (SIGCHI) Conference on Human Factors in Computing Systems, Apr. 24-29, 2004, pp. 8, Association for Computing Machinery (ACM).
Zhang, "A Flexible New Technique for Camera Calibration", Institute of Electrical and Electronics Engineers (IEEE) Transactions on Pattern Analysis and Machine Intelligence, Nov. 2000, pp. 1330-1334, vol. 22, No. 11, IEEE.
"Automated Construction of Robotic Manipulation Programs", Retrieved From <http://repository.cmu.edu/cgi/viewcontent.cgi?article=1030&context=dissertations>>, Jan. 1, 2010, 264 Pages.
"Second Written Opinion Issued in PCT Application No. PCT/US2016/025959", dated Mar. 14, 2017, 11 Pages.
"International Preliminary Report on Patentability Issued in PCT Application No. PCT/US2016/025959", dated Jun. 8, 2017, 12 Pages.

* cited by examiner

AUTOMATED COLLECTION AND LABELING OF OBJECT DATA

BACKGROUND

Autonomous robotic systems include navigation and object manipulation applications that employ physical object detection and recognition. A given autonomous robotic system may be called upon to operate in a wide variety of both indoor and outdoor environments which may be either structured (e.g., controlled) or unstructured (e.g., uncontrolled) and can have varying levels of complexity. As such, robust physical object detection and recognition across a wide variety of object types/classes/categories are needed in order for the robotic system to be able to interact with its environment in a safe and effective manner. This is generally accomplished by using a large set of labeled object data to train the robotic system's navigation and object manipulation applications, where the size of this dataset can be quite large for unstructured environments having a high level of complexity.

Additionally, the World Wide Web currently hosts billions of webpages which collectively currently host approximately one trillion images and these numbers continue to grow at a rapid pace. Various efforts are ongoing to label more of these images with meaningful data.

SUMMARY

Data collection and labeling technique implementations described herein generally involve the automatic collection and labeling of data about a physical object. In one exemplary implementation a mechanical device is configured to maneuver the object within a three-dimensional workspace in a real-world environment, and one or more sensors are configured to capture and output images of the object when it is within one or more prescribed regions of the workspace. The sensors are calibrated to the coordinate system of the mechanical device. Then, for each of a plurality of different poses that are within these regions of the workspace, the mechanical device is used to maneuver the object into the pose, an image of the object is input from each of the sensors while the object is in the pose, data specifying the pose is input from the mechanical device, where this data specifying the pose is in the coordinate system of the mechanical device, and the image of the object input from each of the sensors is labeled with the data specifying the pose and with information identifying the object. A database for the object is then generated, where this database includes the labeled image of the object that is input from each of the sensors for each of the different poses.

In another exemplary implementation the labeled image of the physical object that is received from each of the sensors for each of the different poses is used to train a detector and classifier to detect and recognize the object when it is in an environment that is similar to the real-world environment.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the data collection and labeling technique implementations described herein will become better understood with regard to the following description, appended claims, and accompanying drawings where:

DETAILED DESCRIPTION

Figure 1:
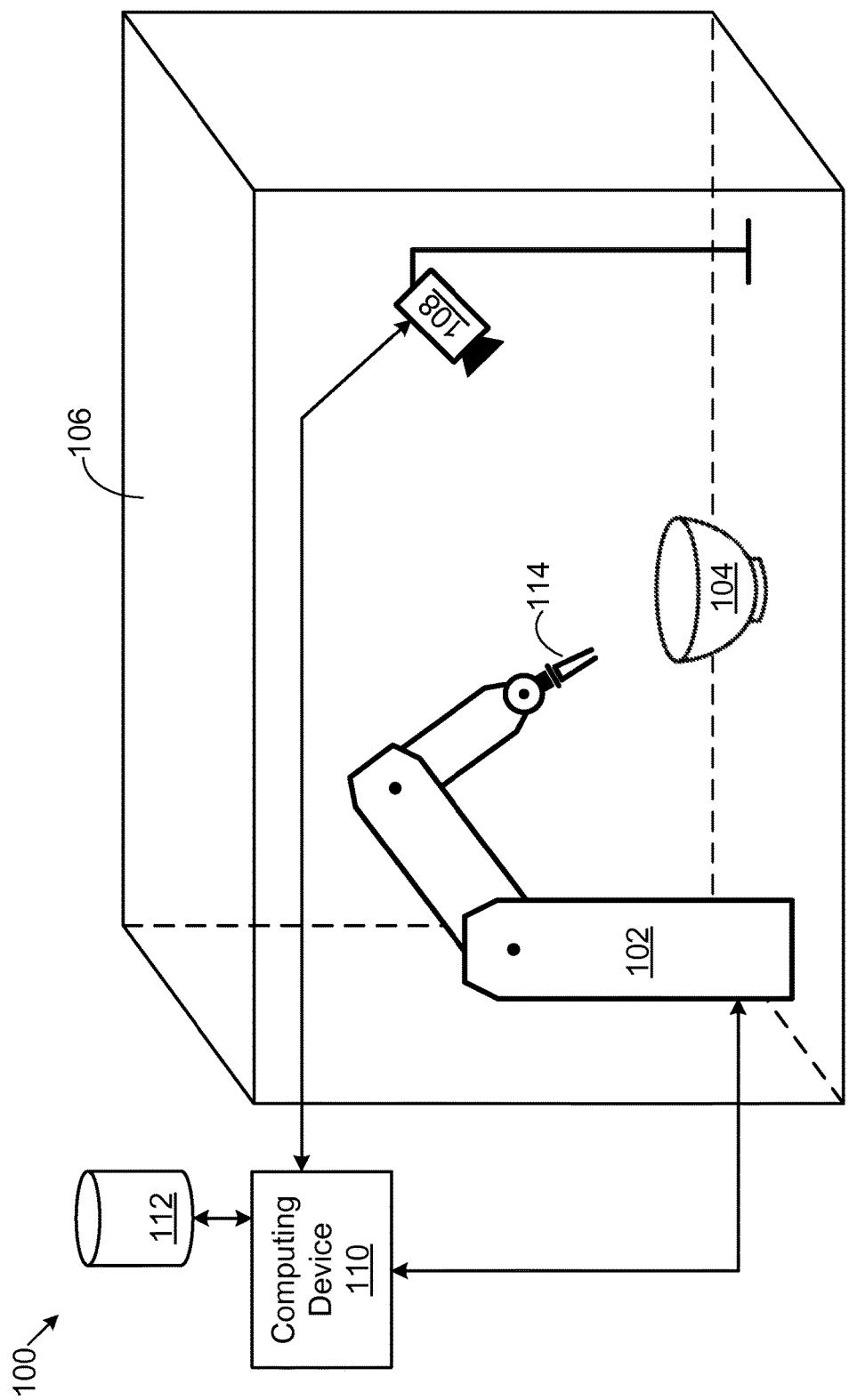
FIG. 1 is a diagram illustrating an exemplary implementation, in simplified form, of a system framework for automatically collecting and labeling data about a physical object, and for training a detector and classifier to detect and recognize the physical object, where the system framework includes a mechanical device that is configured to maneuver the object, and one or more sensors that are configured to capture and output images of the object.

In the following description of data collection and labeling technique implementations reference is made to the accompanying drawings which form a part hereof, and in which are shown, by way of illustration, specific implementations in which the data collection and labeling technique can be practiced. It is understood that other implementations can be utilized and structural changes can be made without departing from the scope of the data collection and labeling technique implementations.

It is also noted that for the sake of clarity specific terminology will be resorted to in describing the data collection and labeling technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the data collection and labeling technique. The appearances of the phrases "in one implementation", "in another implementation", "in an exemplary implementation", "in an alternate implementation", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the data collection and labeling technique does not inherently indicate any particular order nor imply any limitations of the data collection and labeling technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system (herein also referred to as a "computing device").

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Automated Collection and Labeling of Object Data

The data collection and labeling technique implementations described herein generally involve automatically collecting and labeling data about a physical object (e.g., a real-world object), using this data to train a detector and classifier to detect and recognize the object, and then using the trained detector and classifier to detect and recognize the object in a real-world environment. The data collection and labeling technique implementations are advantageous for various reasons including, but not limited to, the following. Generally speaking, the data collection and labeling technique implementations can collect and label data about many different types/classes/categories of physical objects including both animate and inanimate objects. The data collection and labeling technique implementations can also collect and label data about a given physical object when it is in a wide variety of real-world environments including both indoor and outdoor environments, where these environments may be either structured (e.g., controlled) or unstructured (e.g., uncontrolled) and can have varying levels of complexity. The data collection and labeling technique implementations are also very efficient and cost effective in that they can collect and label a large quantity of data about the object with little human intervention, where the quality (e.g., accuracy) of this data is generally limited just by the quality of the equipment that is used to automatically collect the data.

Additionally, the object data that is generated by the data collection and labeling technique implementations described herein is meaningful, real-world data (rather than being artificial/synthesized data) that can be used in various ways. For example, this object data can be used to train the aforementioned navigation and object manipulation applications of a given robotic system or any other type of mechanical device that is configured to maneuver a physical object in a given environment. Once the system/device has been trained, it will then be able to detect, recognize and manipulate the physical object that is associated with the object data. Furthermore, as will be described in more detail hereafter, the object data includes images of the object while it is in a plurality of different poses in a real-world environment, where each of the images is labeled with data specifying the particular pose the object is in and with information identifying the object. As such, if the object data is stored on the World Wide Web it can be used to provide more accurate image searching to users, enhance image accessibility (e.g., it can be used to provide audible descriptions of images to visually impaired users), and block inappropriate images from being delivered to certain users (e.g., children).

FIG. 1 illustrates an exemplary implementation, in simplified form, of a system framework for automatically collecting and labeling data about a physical object, and for training a detector and classifier to detect and recognize (e.g., learning a detection and classification procedure that is capable of detecting and recognizing) the physical object. As exemplified in FIG. 1 the system framework 100 includes a mechanical device 102 (hereafter sometimes referred to as a mechanical means), one or more sensors (e.g., sensor 108) (hereafter sometimes referred to as sensing means), and a computing device 110. The mechanical device 102 operates under the control of the computing device 110 and is configured to maneuver (e.g., position) the physical object 104 (a bowl in the illustrated implementation) within a three-dimensional (3D) workspace 106 in a given real-world environment (e.g., factory environment, among other possible environments). The sensors 108 also operate under the control of the computing device 110 and are configured to capture and output images of the object 104 when it is within one or more prescribed regions of the workspace 106. The term "image" is used herein to refer to a digital image that can be viewed on a display device of a computer system and can also be processed by the computer system. In an exemplary implementation of the of the data collection and labeling technique described herein each of the sensors 108 is static (e.g., the sensor has a fixed location and a fixed rotational orientation which do not change over time) and is disposed at a different location in the environment, where this location may be either inside of the workspace 106 (as illustrated in FIG. 1) or outside of the workspace.

Referring again to FIG. 1, the system framework 100 may also include a data repository 112 (hereafter sometimes referred to as a data storage means). In one implementation of the data collection and labeling technique described herein the data repository 112 is local to the computing device 110 and may in fact be integral thereto. In another implementation of the data collection and labeling technique the data repository 112 is remote from the computing device 110 and is connected thereto by a data communication network (not shown) (e.g., the data repository may be located in the cloud). As will be described in more detail hereafter, in an exemplary implementation of the data collection and labeling technique described herein a database is generated for the physical object 104, and this database can be stored in the data repository 112. The system framework 100 may also include one or more visible light sources (not shown, hereafter sometimes referred to as visible light sourcing means). In an exemplary implementation of the data collection and labeling technique each of the visible light sources is static (e.g., the light source has a fixed location and a fixed rotational orientation which do not change over time) and is disposed at a different location in the environment, where this location may be either inside of the 3D workspace 106 or outside of the workspace. An alternate implementation of the system framework (not shown) is also possible where the computing device is realized as a plurality of computing devices that are in communication with each other via a computer network and thus may be remote from each other.

Referring again to FIG. 1, the mechanical device 102 can be realized in various ways including, but not limited to, the following. In the implementation of the data collection and labeling technique that is illustrated in FIG. 1 the mechanical device 102 is a conventional robotic arm that includes an end-effector 114 which is configured to seize (e.g., grasp) and release the physical object 104. In another implementation (not shown) of the data collection and labeling technique described herein the mechanical device is a conventional computer numerical controlled (CNC) apparatus that includes a tool control point to which a platform is attached, and the object is disposed onto the platform. In yet another implementation (not shown) of the data collection and labeling technique the mechanical device is a conventional mobile robot that includes a platform onto which the object is disposed. In yet another implementation the mechanical device includes both the robotic arm and the CNC apparatus, where the object is movably disposed onto the platform of the CNC apparatus, and the robotic arm can change the location and rotational orientation of the object on the platform.

Referring again to FIG. 1, the sensors 108 can be realized in various ways including, but not limited to, the following. In one implementation of the data collection and labeling technique described herein one or more of the sensors are a conventional structured-light 3D scanner (e.g., a conventional infrared structured-light projector combined with a conventional infrared camera that is matched to the projector). In another implementation of the data collection and labeling technique one or more of the sensors are a conventional modulated-light 3D scanner. In yet another implementation of the data collection and labeling technique one or more of the sensors are a conventional time-of-flight camera. In yet another implementation of the data collection and labeling technique one or more of the sensors include two or more conventional visible light cameras (which may be either monochromatic cameras or color cameras (also known as RGB (red, green and blue) cameras)) that operate together as a stereo camera. In yet another implementation of the data collection and labeling technique one or more of the sensors are a single visible light camera. Additional implementations of the data collection and labeling technique are also possible where the sensors are realized as any combination of the structured-light 3D scanner, the modulated-light 3D scanner, the time-of-flight camera, the two or more visible light cameras that operate together as a stereo camera, and the single visible light camera.

Figure 2:
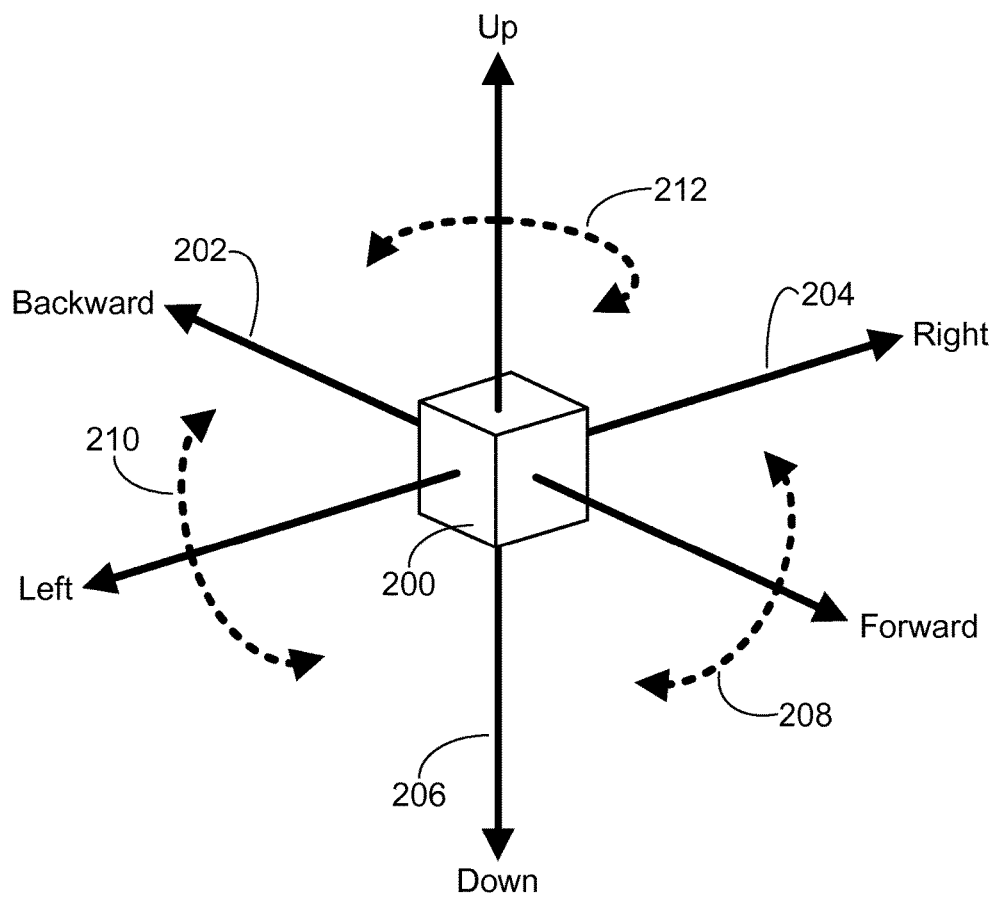
FIG. 2 is a diagram illustrating an exemplary model of the six degrees of freedom for an object in three-dimensional space.

The term "pose" is used herein to refer to the specific location and rotational orientation of a given physical object in a given real-world environment. An object's pose can be specified using various types of data that define the object's location and rotational orientation. As is appreciated in the art of mechanical systems, the term "degrees of freedom" refers to the different modes in which an object is able to move (e.g., the different aspects of motion for the object), where the number of degrees of freedom is equal to the total number of different modes. FIG. 2 illustrates an exemplary six degrees of freedom model for an object in 3D space. As exemplified in FIG. 2, the object 200 can move forward and backward along a first axis 202 (e.g., the y-axis of the Cartesian coordinate system), and this forward/backward movement can be thought of as the object's first degree of freedom. The object 200 can also move right and left along a second axis 204 that is perpendicular to the first axis 202 (e.g., the x-axis of the Cartesian coordinate system), and this right/left movement can be thought of as the object's second degree of freedom. The object 200 can also move up and down along a third axis 206 that is perpendicular to both the first and second axes 202 and 204 (e.g., the z-axis of the Cartesian coordinate system), and this up/down movement can be thought of as the object's third degree of freedom. The object 200 can also rotate 208 about the first axis 202, where this rotation 208 can be thought of as the object's fourth degree of freedom. The object 200 can also rotate 210 about the second axis 204, where this rotation 210 can be thought of as the object's fifth degree of freedom. The object 200 can also rotate 212 about the third axis 206, where this rotation 212 can be thought of as the object's sixth degree of freedom.

Figure 3:
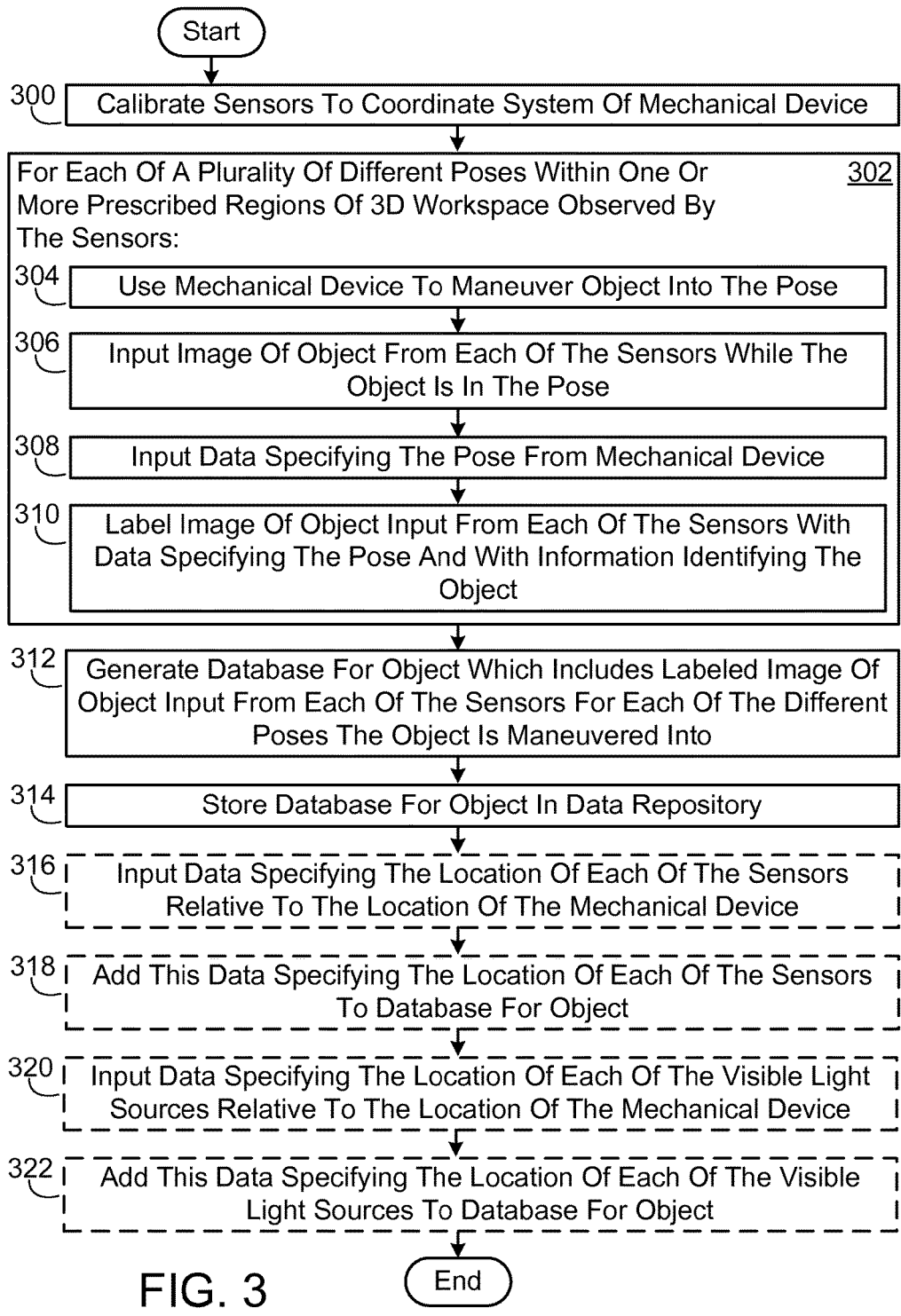
FIG. 3 is a flow diagram illustrating an exemplary implementation, in simplified form, of a process for automatically collecting and labeling data about a physical object.

FIG. 3 illustrates an exemplary implementation, in simplified form, of a process for automatically collecting and labeling data about a physical object. As will be appreciated from the more detailed description that follows and referring again to FIG. 1, the process implementation illustrated in FIG. 3 is based on the system framework 100 implementation illustrated in FIG. 1 and described heretofore. As exemplified in FIG. 3, the process starts with calibrating the sensors to the coordinate system (sometimes referred to as a "coordinate frame") of the mechanical device (process action 300). This sensor calibration can be performed using a variety of conventional methods two examples of which are described hereafter. It is noted that once the sensor calibration of action 300 has been completed for a given mechanical device 102 and a given set of sensors 108 disposed in a given arrangement in the environment, the subsequent process actions illustrated in FIG. 3 can be repeated for a variety of different objects 104 without having to repeat this calibration.

Figure 4:
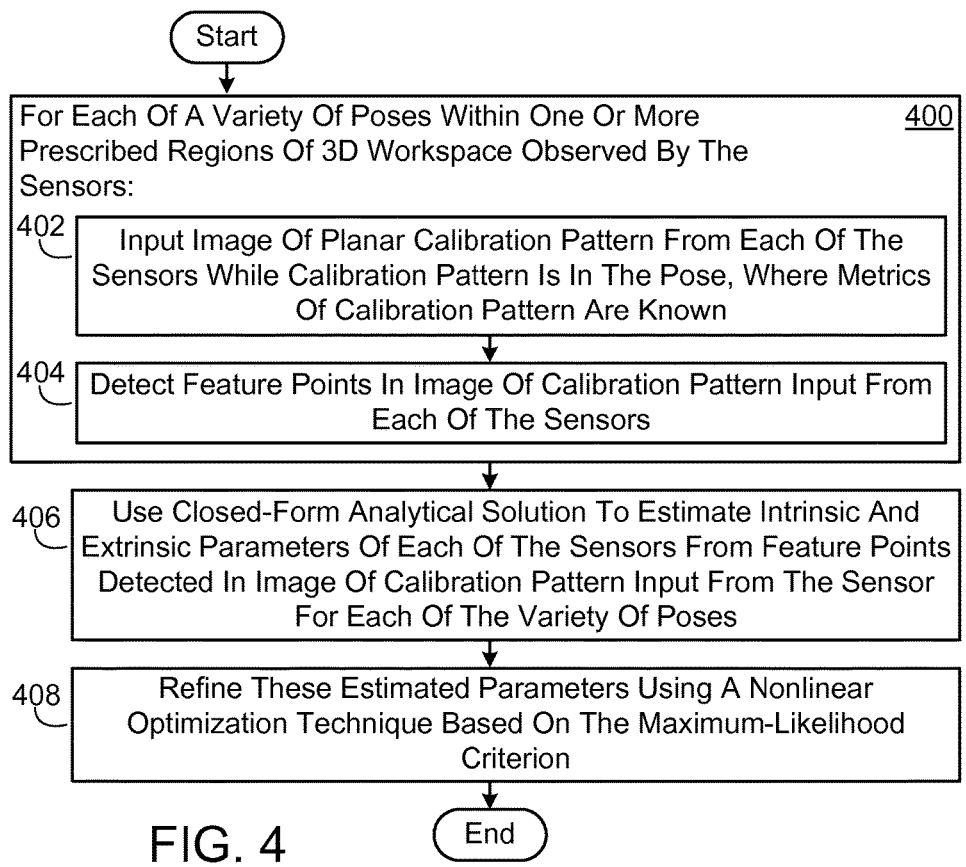
FIG. 4 is a flow diagram illustrating an exemplary implementation, in simplified form, of a process for calibrating the sensors to the coordinate system of the mechanical device.

FIG. 4 illustrates an exemplary implementation, in simplified form, of a process for calibrating the sensors to the coordinate system/frame of the mechanical device, where this process realizes a conventional planar calibration pattern based method that employs a closed-form analytical solution followed by a nonlinear refinement which is based on the maximum-likelihood criterion. As exemplified in FIG. 4, the process starts with the following actions taking place for each of a variety of poses that are within the aforementioned one or more prescribed regions of the 3D workspace that can be observed by the sensors (process action 400). First, an image of a planar calibration pattern is input from each of the sensors while the calibration pattern is in the pose, where the metrics of the calibration pattern are known (process action 402). It is noted that any type of planar pattern can be used as long its metrics on the plane are known. It is also noted that the planar calibration pattern can be placed in the variety of poses in various ways (e.g., the pattern can be manually placed in each of the poses, or the mechanical device can be used to place the pattern in each of the poses, among other possible ways). Feature points are then detected in the image of the calibration pattern that is input from each of the sensors (process action 404), where this feature point detection is performed using conventional methods. After the actions of action 400 have been completed, a conventional closed-form analytical solution is used to estimate the intrinsic and extrinsic parameters of each of the sensors from the feature points that were detected in the image of the calibration pattern input from the sensor for each of the variety of poses that the pattern is placed in (process action 406). These estimated parameters are then refined using a conventional nonlinear optimization technique that is based on the maximum-likelihood criterion (process action 408).

In another implementation of the data collection and labeling technique described herein the sensors are calibrated to the coordinate system/frame of the mechanical device using a conventional automatic in-situ registration and calibration method to compute a coordinate system/frame transformation function that maps coordinates between the coordinate system/frame of the sensors and the coordinate system/frame of the mechanical device. In an exemplary version of this implementation the transformation function that is computed is a non-linear function that is able to account for non-linear characteristics of the sensors and/or the mechanical device. For example, the transformation function can be either a closed-form function or a collection of closed-form functions. The transformation function can also be described using either a lookup table, or a neural net, or the like.

Referring again to FIG. 3, after the sensors have been calibrated to the coordinate system of the mechanical device (action 300), the following actions take place for each of a plurality of different poses that are within the one or more prescribed regions of the 3D workspace that can be observed by the sensors (process action 302). First, the mechanical device is used to maneuver the object into the pose (process action 304). An image of the object is then input from each of the sensors while the object is in the pose (process action 306). Data specifying the pose is then input from the mechanical device (process action 308). The image of the object that is input from each of the sensors is then labeled with the data specifying the pose and with information identifying the object (e.g., information identifying the object's type/class/category) (process action 310).

Figure 5:
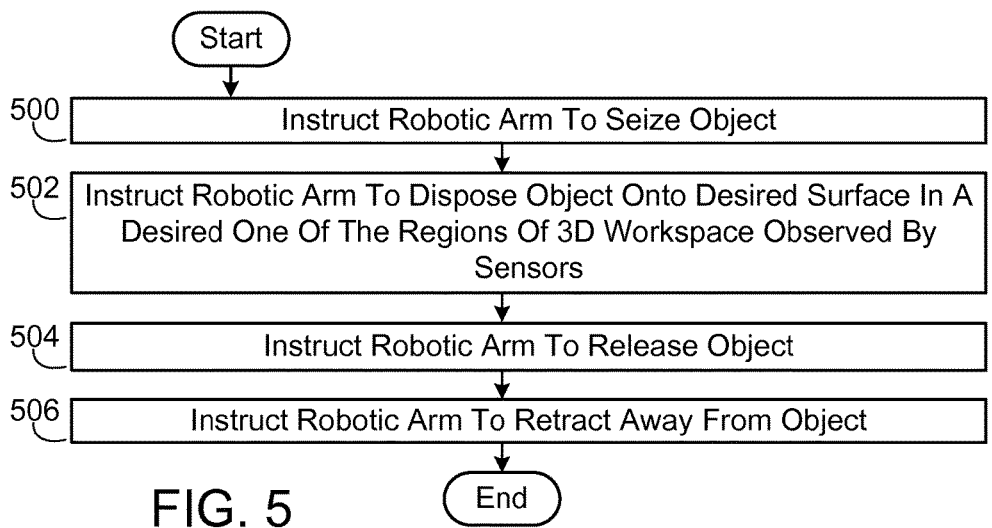
FIG. 5 is a flow diagram illustrating an exemplary implementation, in simplified form, of a process for using the mechanical device to maneuver the physical object into a given pose in the case where the mechanical device is a robotic arm.

FIG. 5 illustrates an exemplary implementation, in simplified form, of a process for using the mechanical device to maneuver the object into the pose in the case where the mechanical device is the aforementioned robotic arm. As exemplified in FIG. 5, the process stars with instructing the robotic arm to seize the object (process action 500). The robotic arm is then instructed to dispose the object onto a desired surface in a desired one of the regions of the 3D workspace that can be observed by the sensors (process action 502). The robotic arm is then instructed to release the object (process action 504). The robotic arm is then instructed to retract away from the object (process action 506).

Referring again to FIG. 3, in the case where the mechanical device is the aforementioned CNC apparatus, the maneuvering of action 304 includes instructing the CNC apparatus to maneuver the platform on which the object is disposed into the pose. In the case where the mechanical device is the aforementioned mobile robot, the maneuvering of action 304 includes instructing the mobile robot on which the object is disposed to maneuver into the pose.

Referring again to FIG. 1, in the case where one or more of the sensors 108 are a structured-light 3D scanner or a modulated-light 3D scanner, the image of the object 104 that is input therefrom includes a depth map. In the case where one or more of the sensors are time-of-flight camera the image of the object that is input therefrom includes a depth map and a color image. In the case where one or more of the sensors include two or more visible light cameras, the image of the object that is input therefrom includes a stereo image. In the case where one or more of the sensors are a single visible light camera, the image of the object that is input therefrom includes either a color image or a monochrome image. In an exemplary implementation of the data collection and labeling technique described herein the data specifying the pose that is input from the mechanical device 102 defines the object's 104 location and rotational orientation within the 3D workspace 106 using the six degrees of freedom model exemplified in FIG. 2.

Referring again to FIG. 3, in an exemplary implementation of the data collection and labeling technique described herein the data specifying the pose that is input from the mechanical device in action 308 is in the coordinate system of the mechanical device. In the case where the mechanical device is the robotic arm, this data specifying the pose includes the coordinates of the pose of the arm's end-effector at the time the object is released. In the case where the mechanical device is the CNC apparatus, this data specifying the pose includes the coordinates of the pose of the apparatus' tool control point after the platform attached thereto has been maneuvered into the pose. In the case where the mechanical device is the mobile robot, the data specifying the pose includes the coordinates of the mobile robot after it has been maneuvered into the pose.

Referring again to FIG. 3, in one implementation of the data collection and labeling technique described herein the image of the object that is input from each of the sensors is labeled (action 310) with the data specifying the pose in just the coordinate system of the mechanical device. In another implementation of the data collection and labeling technique the aforementioned calibration of the sensors (action 300) is used to translate the data specifying the pose from the coordinate system of the mechanical device to the coordinate system of the sensors, and the image of the object that is input from each of the sensors is labeled with the data specifying the pose in both the coordinate system of the mechanical device and the coordinate system of the sensors.

Referring again to FIG. 3, after the afore-described actions of action 302 have been completed, a database for the object is generated, where this database includes the labeled image of the object that is input from each of the sensors for each of the different poses that the object is maneuvered into (process action 312). The database for the object can then be stored in the aforementioned data repository (process action 314). It will be appreciated that the database for the object forms a model of the object which represents how the object looks in different parts of the real-world environment. In an optional implementation of the data collection and labeling technique described herein data specifying the location of each of the sensors relative to the location of the mechanical device can also be input (process action 316), and then this data specifying the location of each of the sensors can be added to the database for the object (process action 318). In another optional implementation of the data collection and labeling technique where the system framework includes the aforementioned visible light sources, data specifying the location of each of the visible light source relative to the location of the mechanical device can also be input (process action 320), and then this data can also be added to the database for the object (process action 322).

Given the foregoing, it will be appreciated that the system and process for automatically collecting and labeling data about a physical object described herein can be used to very efficiently and cost effectively collect and label a large quantity of data about a variety of physical objects in a variety of real-world environments with little human intervention, where the quality of this data is generally limited just by the quality of the mechanical device(s) employed, the quantity of sensors employed, and the quality of the sensors.

Figure 6:
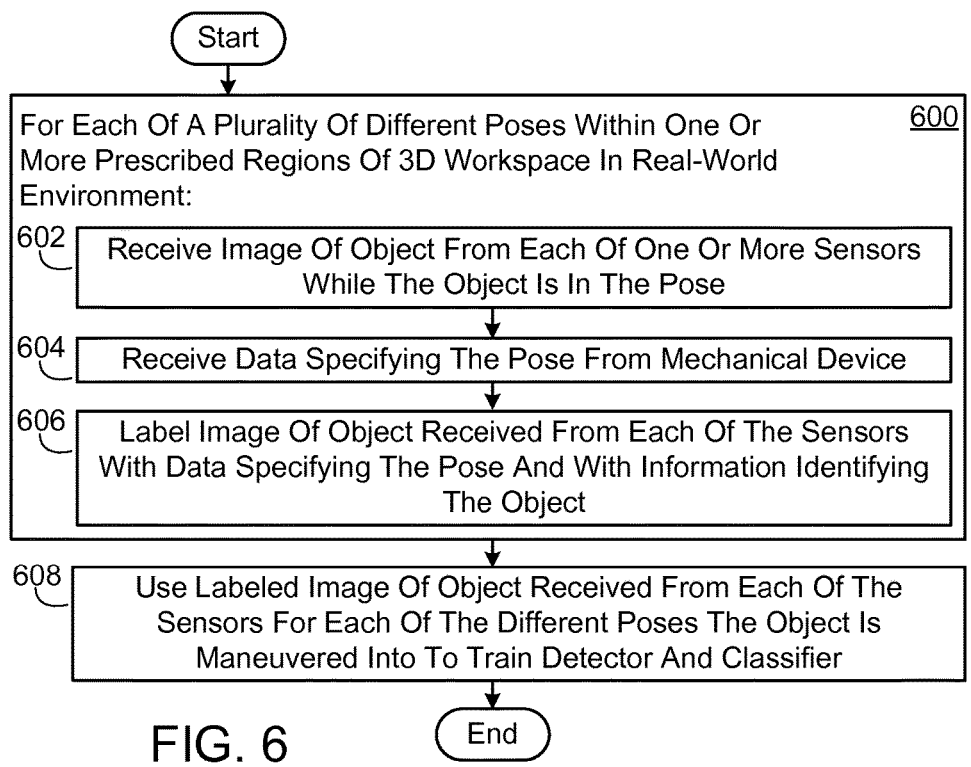
FIG. 6 is a flow diagram illustrating an exemplary implementation, in simplified form, of a process for training a detector and classifier to detect and recognize a physical object.

1.1 Using Collected and Labeled Object Data to Train a Detector and Classifier to Detect and Recognize the Object FIG. 6 illustrates an exemplary implementation, in simplified form, of a process for training a detector and classifier to detect and recognize a physical object. In other words, the process implementation illustrated in FIG. 6 learns a detection and classification procedure that is capable of detecting and recognizing a physical object. As will be appreciated from the more detailed description that follows and referring again to FIG. 1, the process implementation illustrated in FIG. 6 is based on the system framework 100 implementation illustrated in FIG. 1 and described heretofore. As exemplified in FIG. 6, the process starts with the following actions taking place for each of a plurality of different poses that are within one or more prescribed regions of a 3D workspace in a real-world environment (process action 600). First, an image of the object is received from each of one or more sensors while the object is in the pose, where these sensors are configured to capture and output images of the object when it is within these regions of the workspace (process action 602). Data specifying the pose is then received from the mechanical device (process action 604), where this data is in the coordinate system of the mechanical device, and the sensors were previously calibrated to the coordinate system of the mechanical device. The image of the object that is received from each of the sensors is then labeled with the data specifying the pose and with information identifying the object (process action 606).

Referring again to FIG. 6, after the just-described actions of action 600 have been completed, the labeled image of the object that is received from each of the sensors for each of the different poses that the object is maneuvered into is used to train the detector and classifier, where the trained detector and classifier is then able to detect and recognize the object when it is in an environment that is similar to the real-world environment (process action 608). In an exemplary implementation of the data collection and labeling technique described herein this detector and classifier training is performed using any machine learning method such as a conventional logistic regression method, or a conventional decision trees method, or a conventional support vector machine method, among other types of machine learning methods. It is noted that the just-described process for training a detector and classifier can be used to train a variety of detectors and classifiers including a conventional support vector machine, or a conventional artificial neural network, or a conventional Bayesian statistical detector and classifier, among other types of detectors and classifiers.

Figure 7:
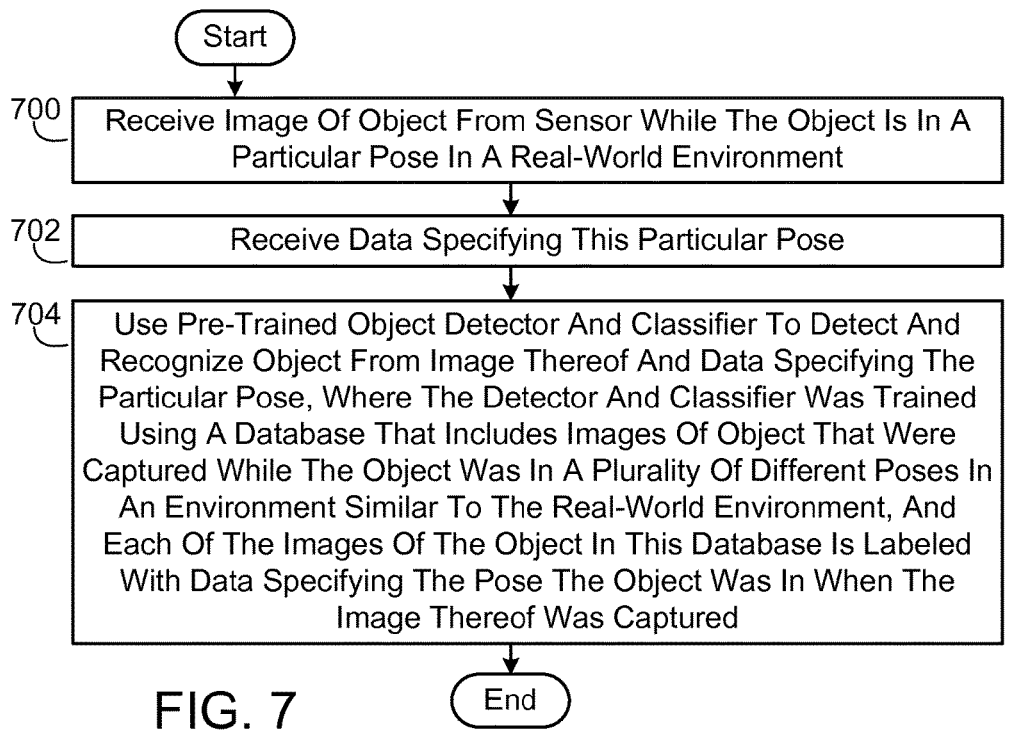
FIG. 7 is a flow diagram illustrating an exemplary implementation, in simplified form, of a process for detecting and recognizing a physical object in a real-world environment.

FIG. 7 illustrates an exemplary implementation, in simplified form, of a process for detecting and recognizing a physical object in a real-world environment. As will be appreciated from the more detailed description that follows and referring again to FIG. 1, the process implementation illustrated in FIG. 7 is based on the system framework 100 implementation illustrated in FIG. 1. As exemplified in FIG. 7, the process starts with receiving an image of the object from a sensor while the object is in a particular pose in the real-world environment (process action 700). Data specifying this particular pose is then received (process action 702), where this data can be generated in a variety of ways. For example, conventional methods can be used to determine the data specifying the particular pose from a combination of the image of the object that is received from the sensor and the aforementioned intrinsic and extrinsic parameters of the sensor. A pre-trained object detector and classifier (e.g., a pre-learned object detection and classification procedure) is then used to detect and recognize the object from the image thereof and the data specifying the particular pose, where the detector and classifier was trained using a database that includes images of the object that were captured while the object was in a plurality of different poses in an environment that is similar to the real-world environment, and each of the images of the object in this database is labeled with data specifying the pose the object was in when the image thereof was captured (process action 704).

2.0 Other Implementations

While the data collection and labeling technique has been described by specific reference to implementations thereof, it is understood that variations and modifications thereof can be made without departing from the true spirit and scope of the data collection and labeling technique. By way of example but not limitation, other types of sensors can also be used to capture and output data about the physical object while it is in the different poses. For example, in the case where the mechanical device is a robotic arm one or more force sensors can be attached to different prescribed locations on the arm's end-effector and the force that is applied to each of the force sensors can be input/recorded as the arm is maneuvering the object into the different poses. In addition to using sensors that capture depth information in the form of a depth map or a stereo image, depth information can also be captured using other types of sensors such as an ultrasound transmitter combined with an ultrasound receiver that is matched to the ultrasound transmitter.

It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 8:
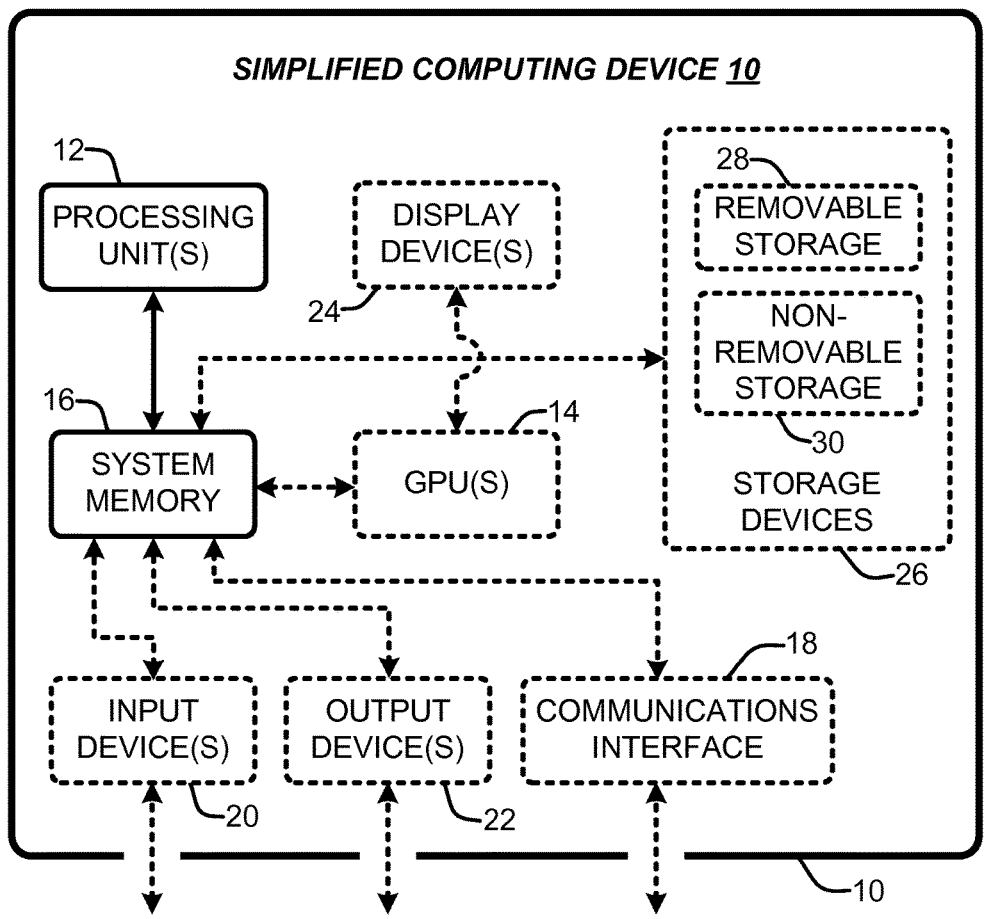
FIG. 8 is a diagram illustrating a simplified example of a general-purpose computer system on which various implementations and elements of the data collection and labeling technique, as described herein, may be realized.

The data collection and labeling technique implementations described herein are operational within numerous types of general purpose or special purpose computing system environments or configurations. FIG. 8 illustrates a simplified example of a general-purpose computer system on which various implementations and elements of the data collection and labeling technique, as described herein, may be implemented. It is noted that any boxes that are represented by broken or dashed lines in the simplified computing device 10 shown in FIG. 8 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the data collection and labeling technique implementations described herein, the device should have a sufficient computational capability and system memory to enable basic computational operations. In particular, the computational capability of the simplified computing device 10 shown in FIG. 8 is generally illustrated by one or more processing unit(s) 12, and may also include one or more graphics processing units (GPUs) 14, either or both in communication with system memory 16. Note that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the data collection and labeling technique implementations described herein, including input, output, control, feedback, and response to one or more users or other devices or systems associated with the data collection and labeling technique implementations, are enabled by a variety of Natural User Interface (NUI) scenarios. The NUI techniques and scenarios enabled by the data collection and labeling technique implementations include, but are not limited to, interface technologies that allow one or more users user to interact with the data collection and labeling technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the data collection and labeling technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the data collection and labeling technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 8 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various data collection and labeling technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The data collection and labeling technique implementations described herein may be further described in the general context of computer-executable instructions, such as program modules, being executed by a computing device. Generally, program modules include routines, programs, objects, components, data structures, and the like, that perform particular tasks or implement particular abstract data types. The data collection and labeling technique implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a system is employed for collecting and labeling data about a physical object. This system includes a mechanical device configured to maneuver the object within a 3D workspace in a real-world environment, and one or more sensors configured to capture and output images of the object when it is within one or more prescribed regions of the workspace. The system also includes a computing device and a computer program having program modules executable by the computing device. The computing device is directed by the program modules of the computer program to calibrate the sensors to the coordinate system of the mechanical device, for each of a plurality of different poses within these regions of the workspace, use the mechanical device to maneuver the object into the pose, input an image of the object from each of the sensors while the object is in the pose, input data specifying the pose from the mechanical device, the data specifying the pose being in the coordinate system of the mechanical device, and label the image of the object input from each of the sensors with the data specifying the pose and with information identifying the object, and generate a database for the object, where this database includes the labeled image of the object input from each of the sensors for each of these different poses.

In one implementation of the just-described system, the mechanical device includes a robotic arm that includes an end-effector configured to seize and release the object, the action of using the mechanical device to maneuver the object into the pose includes the actions of, instructing the robotic arm to seize the object, instructing the robotic arm to dispose the object onto a desired surface in a desired one of the regions of the workspace, instructing the robotic arm to release the object, and instructing the robotic arm to retract away from the object, and the data specifying the pose includes the coordinates of the pose of the end-effector at the time the object is released. In another implementation the mechanical device includes a CNC apparatus that includes a tool control point to which a platform is attached, the object is disposed onto the platform, the action of using the mechanical device to maneuver the object into the pose includes an action of instructing the CNC apparatus to maneuver the platform into the pose, and the data specifying the pose includes the coordinates of the pose of the tool control point after the platform has been maneuvered into the pose. In another implementation the mechanical device includes a mobile robot that includes a platform onto which the object is disposed, the action of using the mechanical device to maneuver the object into the pose includes an action of instructing the mobile robot to maneuver into the pose, and the data specifying the pose includes the coordinates of the mobile robot after it has been maneuvered into the pose.

In one implementation, one or more of the sensors include a structured-light 3D scanner, and the image of the object input therefrom includes a depth map. In another implementation, one or more of the sensors include a modulated-light 3D scanner, and the image of the object input therefrom includes a depth map. In another implementation, one or more of the sensors include a time-of-flight camera, and the image of the object input therefrom includes a depth map and a color image. In another implementation, one or more of the sensors include two or more visible light cameras that operate together as a stereo camera, and the image of the object input therefrom includes a stereo image. In another implementation, one or more of the sensors include a single visible light camera, and the image of the object input therefrom includes either a color image or a monochrome image.

The implementations described in any of the previous paragraphs in this section may also be combined with each other, and with one or more of the implementations and versions described prior to this section. For example, some or all of the preceding implementations and versions may be combined with the foregoing implementation where the action of calibrating the sensors to the coordinate system of the mechanical device includes the actions of: for each of a variety of poses within the regions of the workspace, inputting an image of a planar calibration pattern from each of the sensors while this pattern is in the pose, the metrics of this pattern being known, and detecting feature points in the image of this pattern input from each of the sensors; using a closed-form analytical solution to estimate the intrinsic and extrinsic parameters of each of the sensors from the feature points detected in the image of this pattern input from the sensor for each of this variety of poses; and refining these estimated parameters using a nonlinear optimization technique based on the maximum-likelihood criterion. In addition, some or all of the preceding implementations and versions may be combined with the foregoing implementation where the action of calibrating the sensors to the coordinate system of the mechanical device includes an action of using an automatic in-situ registration and calibration method to compute a coordinate system transformation function that maps coordinates between the coordinate system of the sensors and the coordinate system of the mechanical device.

In addition, some or all of the preceding implementations and versions may be combined with the foregoing implementation where each of the sensors is static and is disposed at a different location in the environment. In addition, some or all of the preceding implementations and versions may be combined with the foregoing implementation where the computing device is further directed by the program modules of the computer program to: input data specifying the location of each of the sensors relative to the location of the mechanical device, and add this data specifying the location of each of the sensors to the database. In addition, some or all of the preceding implementations and versions may be combined with the foregoing implementation where the system further includes one or more visible light sources, each of the visible light sources is static and is disposed at a different location in the environment, and the computing device is further directed by the program modules of the computer program to, input data specifying the location of each of the visible light sources relative to the location of the mechanical device, and add this data specifying the location of each of the visible light sources to the database.

In addition, some or all of the preceding implementations and versions may be combined with the foregoing implementation where the action of labeling the image of the object input from each of the sensors with the data specifying the pose includes the actions of: using the calibration of the sensors to translate the data specifying the pose from the coordinate system of the mechanical device to the coordinate system of the sensors; and labeling the image of the object input from each of the sensors with the data specifying the pose in both the coordinate system of the mechanical device and the coordinate system of the sensors. In addition, some or all of the preceding implementations and versions may be combined with the foregoing implementation where the system further includes a data repository, and the computing device is further directed by the program modules of the computer program to store the database in the data repository.

In another implementation, a system is employed for training a detector and classifier to detect and recognize a physical object. This system includes one or more computing devices and a computer program having program modules executable by the one or more computing devices. The one or more computing devices are in communication with each other via a computer network whenever there is a plurality of computing devices. The one or more computing devices are directed by the program modules of the computer program to, for each of a plurality of different poses within one or more prescribed regions of a three-dimensional workspace in a real-world environment, receive an image of the object from each of one or more sensors while the object is in the pose, receive data specifying the pose from a mechanical device configured to maneuver the object into the pose, the data specifying the pose being in the coordinate system of the mechanical device, the sensors being calibrated to the coordinate system of the mechanical device, and label the image of the object received from each of the sensors with the data specifying the pose, and use the labeled image of the object received from each of the sensors for each of the different poses to train the detector and classifier, this trained detector and classifier then being able to detect and recognize the object when it is in an environment similar to the real-world environment.

In one implementation of the just-described system, the detector and classifier training is performed using a machine learning method that includes one of: a logistic regression method; or a decision trees method; or a support vector machine method. The implementations described in any of the previous paragraphs in this section may also be combined with each other, and with one or more of the implementations and versions described prior to this section. For example, some or all of the preceding implementations and versions may be combined with the foregoing implementation where the detector and classifier includes one of: a support vector machine; or an artificial neural network; or a Bayesian statistical detector and classifier.

In another implementation, a system is employed for detecting and recognizing a physical object in a real-world environment. This system includes a sensor configured to capture and output images of the object when it is in the real-world environment, one or more computing devices, and a computer program having program modules executable by the one or more computing devices. The one or more computing devices are in communication with each other via a computer network whenever there is a plurality of computing devices. The one or more computing devices are directed by the program modules of the computer program to, receive an image of the object from the sensor while the object is in a particular pose in the real-world environment, receive data specifying this particular pose, and use a pre-trained object detector and classifier to detect and recognize the object from the image thereof and the data specifying this particular pose, this detector and classifier having been trained using a database that includes images of the object that were captured while the object was in a plurality of different poses in an environment similar to the real-world environment, each of the images of the object in this database being labeled with data specifying the pose the object was in when the image thereof was captured.

In one implementation, a data collection and labeling system is implemented by a means for automatically collecting and labeling data about a physical object. The data collection and labeling system includes a mechanical means for maneuvering the object within a 3D workspace in a real-world environment, and one or more sensing means for capturing and outputting images of the object when it is within one or more prescribed regions of the workspace. The data collection and labeling system also includes a computing device that includes a processor configured to execute a calibration step for calibrating the sensing means to the coordinate system of the mechanical means, for each of a plurality of different poses within these regions of the workspace, an object maneuvering step for using the mechanical means to maneuver the object into the pose, an image inputting step for inputting an image of the object from each of the sensing means while the object is in the pose, a pose data inputting step for inputting data specifying the pose from the mechanical means, the data specifying the pose being in the coordinate system of the mechanical means, and an image labeling step for labeling the image of the object input from each of the sensing means with the data specifying the pose and with information identifying the object, and a database generation step for generating a database for the object, this database including the labeled image of the object input from each of the sensing means for each of these different poses.

In one version of the just-described data collection and labeling system, the mechanical means includes a robotic arm that includes an end-effector configured to seize and release the object, the object maneuvering step for using the mechanical means to maneuver the object into the pose includes an object seizing step for instructing the robotic arm to seize the object, an object disposal step for instructing the robotic arm to dispose the object onto a desired surface in a desired one of the regions of the workspace, an object releasing step for instructing the robotic arm to release the object, and an arm retraction step for instructing the robotic arm to retract away from the object, and the data specifying the pose includes the coordinates of the pose of the end-effector at the time the object is released. In another version, the mechanical means includes a CNC apparatus that includes a tool control point to which a platform is attached, the object is disposed onto the platform, the object maneuvering step for using the mechanical means to maneuver the object into the pose includes a platform maneuvering step for instructing the CNC apparatus to maneuver the platform into the pose, and the data specifying the pose includes the coordinates of the pose of the tool control point after the platform has been maneuvered into the pose. In another version, the mechanical means includes a mobile robot that includes a platform onto which the object is disposed, the object maneuvering step for using the mechanical means to maneuver the object into the pose includes a robot maneuvering step for instructing the mobile robot to maneuver into the pose, and the data specifying the pose includes the coordinates of the mobile robot after it has been maneuvered into the pose.

Some or all of the preceding implementations and versions of the data collection and labeling system may be combined with an implementation where the calibration step for calibrating the sensing means to the coordinate system of the mechanical means includes: for each of a variety of poses within the regions of the workspace, a calibration pattern inputting step for inputting an image of a planar calibration pattern from each of the sensing means while this pattern is in the pose, the metrics of this pattern being known, and a feature points detection step for detecting feature points in the image of this pattern input from each of the sensing means; a parameters estimation step for using a closed-form analytical solution to estimate the intrinsic and extrinsic parameters of each of the sensing means from the feature points detected in the image of this pattern input from the sensing means for each of the variety of poses; and a parameters refinement step for refining these estimated parameters using a nonlinear optimization technique based on the maximum-likelihood criterion. Some or all of the preceding implementations and versions of the data collection and labeling system may also be combined with an implementation where the calibration step for calibrating the sensing means to the coordinate system of the mechanical means includes a transformation function computation step for using an automatic in-situ registration and calibration method to compute a coordinate system transformation function that maps coordinates between the coordinate system of the sensing means and the coordinate system of the mechanical means.

In addition, some or all of the preceding implementations and versions of the data collection and labeling system may be combined with an implementation where the processor is further configured to execute: a sensing means location data inputting step for inputting data specifying the location of each of the sensing means relative to the location of the mechanical means, and a sensing means location database addition step for adding this data specifying the location of each of the sensing means to the database for the object. Some or all of the preceding implementations and versions of the data collection and labeling system may also be combined with an implementation where the data collection and labeling system further includes one or more visible light sourcing means for producing a source of visible light, each of the visible light sourcing means is static and is disposed at a different location in the environment, and the processor is further configured to execute a visible light sourcing means location data inputting step for inputting data specifying the location of each of the visible light sourcing means relative to the location of the mechanical means, and a visible light sourcing means location database addition step for adding this data specifying the location of each of the visible light sourcing means to the database for the object.

Some or all of the preceding implementations and versions of the data collection and labeling system may also be combined with an implementation where the image labeling step for labeling the image of the object input from each of the sensing means with the data specifying the pose includes: a pose data translation step for using the calibration of the sensing means to translate the data specifying the pose from the coordinate system of the mechanical means to the coordinate system of the sensing means; and another image labeling step for labeling the image of the object input from each of the sensing means with the data specifying the pose in both the coordinate system of the mechanical means and the coordinate system of the sensing means. Some or all of the preceding implementations and versions of the data collection and labeling system may also be combined with an implementation where the data collection and labeling system further includes a data storage means for storing data, and the processor is further configured to execute a database storage step for storing the database for the object in the data storage means.

In another implementation, a detector and classifier training system is implemented by a means for training a detector and classifier to detect and recognize a physical object. The detector and classifier training system includes one or more computing devices, the computing devices being in communication with each other via a computer network whenever there is a plurality of computing devices, the computing devices including processors configured to execute: for each of a plurality of different poses within one or more prescribed regions of a three-dimensional workspace in a real-world environment, an image receiving step for receiving an image of the object from each of one or more sensors while the object is in the pose, a pose data receiving step for receiving data specifying the pose from a mechanical means for maneuvering the object into the pose, the data specifying the pose being in the coordinate system of the mechanical means, the sensors being calibrated to the coordinate system of the mechanical means, and an image labeling step for labeling the image of the object received from each of the sensors with the data specifying the pose, and a training step for using the labeled image of the object received from each of the sensors for each of the different poses to train the detector and classifier, this trained detector and classifier then being able to detect and recognize the object when it is in an environment similar to the real-world environment.

In another implementation, an object detection and recognition system is implemented by a means for recognizing a physical object in a real-world environment. The object detection and recognition system includes: a sensing means for capturing and outputting images of the object when it is in the real-world environment; and one or more computing devices, the computing devices being in communication with each other via a computer network whenever there is a plurality of computing devices, the computing devices including processors configured to execute an image receiving step for receiving an image of the object from the sensing means while the object is in a particular pose in the real-world environment, a pose data receiving step for receiving data specifying this particular pose, and an object detection and recognition step for using a pre-trained object detector and classifier to detect and recognize the object from the image thereof and the data specifying this particular pose, this detector and classifier having been trained using a database that includes images of the object that were captured while the object was in a plurality of different poses in an environment similar to the real-world environment, each of the images of the object in this database being labeled with data specifying the pose the object was in when the image thereof was captured.

Wherefore, what is claimed is:

1. A system for automatically collecting and labeling data about a physical object, comprising:
    a mechanical device configured to maneuver the object within a three-dimensional (3D) workspace in a real-world environment;
    one or more sensors configured to capture and output images of the object when it is within one or more prescribed regions of the workspace;
    a computing device; and
    a computer program having program modules executable by the computing device, the computing device being directed by the program modules of the computer program to,
        calibrate the sensors to the coordinate system of the mechanical device,
        for each of a plurality of different object poses within said regions of the workspace,
            use the mechanical device to maneuver the object into the object pose,
            input an image of the object from each of the sensors while the object is in the object pose,
            input data specifying the object pose, the data specifying the pose being in the coordinate system of the mechanical device, and
            label the image of the object input from each of the sensors with the data specifying the object pose and with information identifying the object, and
        generate a database for the object, said database comprising the labeled image of the object input from each of the sensors for each of said different object poses.

2. The system of claim 1, wherein,
the mechanical device comprises a robotic arm comprising an end-effector configured to seize and release the object,
the action of using the mechanical device to maneuver the object into the pose comprises the actions of,
instructing the robotic arm to seize the object,
instructing the robotic arm to dispose the object onto a desired surface in a desired one of said regions of the workspace,
instructing the robotic arm to release the object, and
instructing the robotic arm to retract away from the object, and
the data specifying the pose comprises the coordinates of the pose of the end-effector at the time the object is released.

3. The system of claim 1, wherein,
the mechanical device comprises a computer numerical controlled (CNC) apparatus comprising a tool control point to which a platform is attached,
the object is disposed onto the platform,
the action of using the mechanical device to maneuver the object into the pose comprises an action of instructing the CNC apparatus to maneuver the platform into the pose, and
the data specifying the pose comprises the coordinates of the pose of the tool control point after the platform has been maneuvered into the pose.

4. The system of claim 1, wherein,
the mechanical device comprises a mobile robot comprising a platform onto which the object is disposed,
the action of using the mechanical device to maneuver the object into the pose comprises an action of instructing the mobile robot to maneuver into the pose, and
the data specifying the pose comprises the coordinates of the mobile robot after it has been maneuvered into the pose.

5. The system of claim 1, wherein the action of calibrating the sensors to the coordinate system of the mechanical device comprises the actions of:
for each of a variety of poses within said regions of the workspace,
inputting an image of a planar calibration pattern from each of the sensors while said pattern is in the pose, the metrics of said pattern being known, and
detecting feature points in the image of said pattern input from each of the sensors;
using a closed-form analytical solution to estimate the intrinsic and extrinsic parameters of each of the sensors from the feature points detected in the image of said pattern input from the sensor for each of said variety of poses; and
refining said estimated parameters using a nonlinear optimization technique based on the maximum-likelihood criterion.

6. The system of claim 1, wherein the action of calibrating the sensors to the coordinate system of the mechanical device comprises an action of using an automatic in-situ registration and calibration method to compute a coordinate system transformation function that maps coordinates between the coordinate system of the sensors and the coordinate system of the mechanical device.

7. The system of claim 1, wherein one or more of the sensors comprise a structured-light 3D scanner, and the image of the object input therefrom comprises a depth map.

8. The system of claim 1, wherein one or more of the sensors comprise a modulated-light 3D scanner, and the image of the object input therefrom comprises a depth map.

9. The system of claim 1, wherein one or more of the sensors comprise a time-of-flight camera, and the image of the object input therefrom comprises a depth map and a color image.

10. The system of claim 1, wherein one or more of the sensors comprise two or more visible light cameras that operate together as a stereo camera, and the image of the object input therefrom comprises a stereo image.

11. The system of claim 1, wherein one or more of the sensors comprise a single visible light camera, and the image of the object input therefrom comprises either a color image or a monochrome image.

12. The system of claim 1, wherein each of the sensors is static and is disposed at a different location in the environment.

13. The system of claim 1, wherein the computing device is further directed by the program modules of the computer program to:
input data specifying the location of each of the sensors relative to the location of the mechanical device, and
add said data specifying the location of each of the sensors to said database.

14. The system of claim 1, wherein,
the system further comprises one or more visible light sources,
each of the visible light sources is static and is disposed at a different location in the environment, and
the computing device is further directed by the program modules of the computer program to,
input data specifying the location of each of the visible light sources relative to the location of the mechanical device, and
add said data specifying the location of each of the visible light sources to said database.

15. The system of claim 1, wherein the action of labeling the image of the object input from each of the sensors with the data specifying the pose comprises the actions of:
using said calibration of the sensors to translate the data specifying the pose from the coordinate system of the mechanical device to the coordinate system of the sensors; and
labeling the image of the object input from each of the sensors with the data specifying the pose in both the coordinate system of the mechanical device and the coordinate system of the sensors.

16. The system of claim 1, wherein,
the system further comprises a data repository, and
the computing device is further directed by the program modules of the computer program to store said database in the data repository.

17. A system for training a detector and classifier to detect and recognize a physical object, comprising:
one or more computing devices, said computing devices being in communication with each other via a computer network whenever there is a plurality of computing devices; and
a computer program having program modules executable by the one or more computing devices, the one or more computing devices being directed by the program modules of the computer program to,
for each of a plurality of different object poses within one or more prescribed regions of a three-dimensional workspace in a real-world environment, receive an image of the object from each of one or more sensors while the object is in the object pose, said sensors being configured to capture and output images of the object when it is within said regions of the workspace, receive data specifying the object pose from a mechanical device configured to maneuver the object into the pose, the data specifying the pose being in the coordinate system of the mechanical device, the sensors being calibrated to the coordinate system of the mechanical device, and label the image of the object received from each of the sensors with the data specifying the object pose, and use the labeled image of the object received from each of the sensors for each of said different object poses to train the detector and classifier, said trained detector and classifier then being able to detect and recognize the object when it is in an environment similar to the real-world environment.

18. The system of claim 17, wherein said detector and classifier training is performed using a machine learning method comprising one of:
a logistic regression method; or
a decision trees method; or
a support vector machine method.

19. The system of claim 17, wherein the detector and classifier comprises one of:
a support vector machine; or
an artificial neural network; or
a Bayesian statistical detector and classifier.

20. A system for detecting and recognizing a physical object in a real-world environment, comprising:
a sensor configured to capture and output images of the object when it is in the real-world environment;
one or more computing devices, said computing devices being in communication with each other via a computer network whenever there is a plurality of computing devices; and
a computer program having program modules executable by the one or more computing devices, the one or more computing devices being directed by the program modules of the computer program to,
receive an image of the object from the sensor while the object is in a particular object pose in the real-world environment,
receive data specifying said particular object pose, and
use a pre-trained object detector and classifier to detect and recognize the object from the image thereof and the data specifying said particular object pose, said detector and classifier having been trained using a database comprising images of the object that were captured while the object was maneuvered by a mechanical device into a plurality of different object poses in an environment similar to the real-world environment, each of the images of the object in said database being labeled with data specifying the object pose the object was in when the image thereof was captured.

* * * * *